(12) United States Patent
Givol et al.

(10) Patent No.: US 10,904,195 B2
(45) Date of Patent: *Jan. 26, 2021

(54) DYNAMIC RE-CONFIGURATION OF A USER INTERFACE BASED ON TRANSACTION INFORMATION

(71) Applicant: Capital One Services, LLC, McLean, VA (US)

(72) Inventors: Dan Givol, Arlington, VA (US); Benjamin Lindquist, Falls Church, VA (US); Victor Mayaki, Aldie, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,350

(22) Filed: Nov. 7, 2018

(65) Prior Publication Data

US 2019/0288974 A1    Sep. 19, 2019

Related U.S. Application Data

(63) Continuation of application No. 15/922,560, filed on Mar. 15, 2018, now Pat. No. 10,135,775.

(51) Int. Cl.
| | |
|---|---|
| *H04L 12/58* | (2006.01) |
| *G07G 1/01* | (2006.01) |
| *G07F 9/02* | (2006.01) |
| *G06Q 20/40* | (2012.01) |
| *G07G 1/00* | (2006.01) |
| *G06Q 20/20* | (2012.01) |
| *G07F 19/00* | (2006.01) |

(52) U.S. Cl.
CPC ............. *H04L 51/26* (2013.01); *G06Q 20/20* (2013.01); *G06Q 20/40* (2013.01); *G06Q 20/405* (2013.01); *G07F 9/023* (2013.01); *G07F 19/206* (2013.01); *G07G 1/0009* (2013.01); *G07G 1/01* (2013.01); *H04L 51/22* (2013.01)

(58) Field of Classification Search
CPC ....... H04L 51/26; H04L 51/22; H04L 12/586; H04L 51/16; G06Q 20/40; G06Q 10/107; G06Q 30/06; G06Q 50/16
See application file for complete search history.

(56) References Cited

U.S. PATENT DOCUMENTS

| | | |
|---|---|---|
| 6,421,709 B1 | 7/2002 | McCormick et al. |
| 7,433,834 B2 | 10/2008 | Joao |
| 8,447,674 B2 | 5/2013 | Choudhuri et al. |
| 10,135,775 B1 | 11/2018 | Givol et al. |
| 2005/0165680 A1 | 7/2005 | Keeling |

(Continued)

*Primary Examiner* — Alina A Boutah
(74) *Attorney, Agent, or Firm* — Harrity & Harrity, LLP

(57) ABSTRACT

A device may receive transaction information that identifies a set of third parties. The device may process messages in an electronic messaging account using a set of processing techniques after receiving the transaction information. The device may identify, in the electronic messaging account, a first set of messages associated with the set of third parties. The device may determine a manner in which to configure a user interface of an application associated with a user device to display the first set of messages based on the transaction information. The device may provide a set of instructions to the user device to configure the user interface of the application to display the first set of messages.

20 Claims, 6 Drawing Sheets

(56) References Cited

U.S. PATENT DOCUMENTS

| | | |
|---|---|---|
| 2007/0203836 A1 | 8/2007 | Dodin |
| 2011/0289161 A1 | 11/2011 | Rankin, Jr. |
| 2015/0081557 A1 | 3/2015 | Kinfoil |
| 2015/0127502 A1 | 5/2015 | Knepfle |
| 2015/0356556 A1 | 12/2015 | Celikyilmaz |
| 2016/0309000 A1 | 10/2016 | Mao |
| 2017/0046679 A1 | 2/2017 | Gotlieb |
| 2017/0054668 A1 | 2/2017 | Lee |
| 2017/0255974 A1 | 9/2017 | Kulkarni |
| 2018/0063070 A1 | 3/2018 | Zucker |

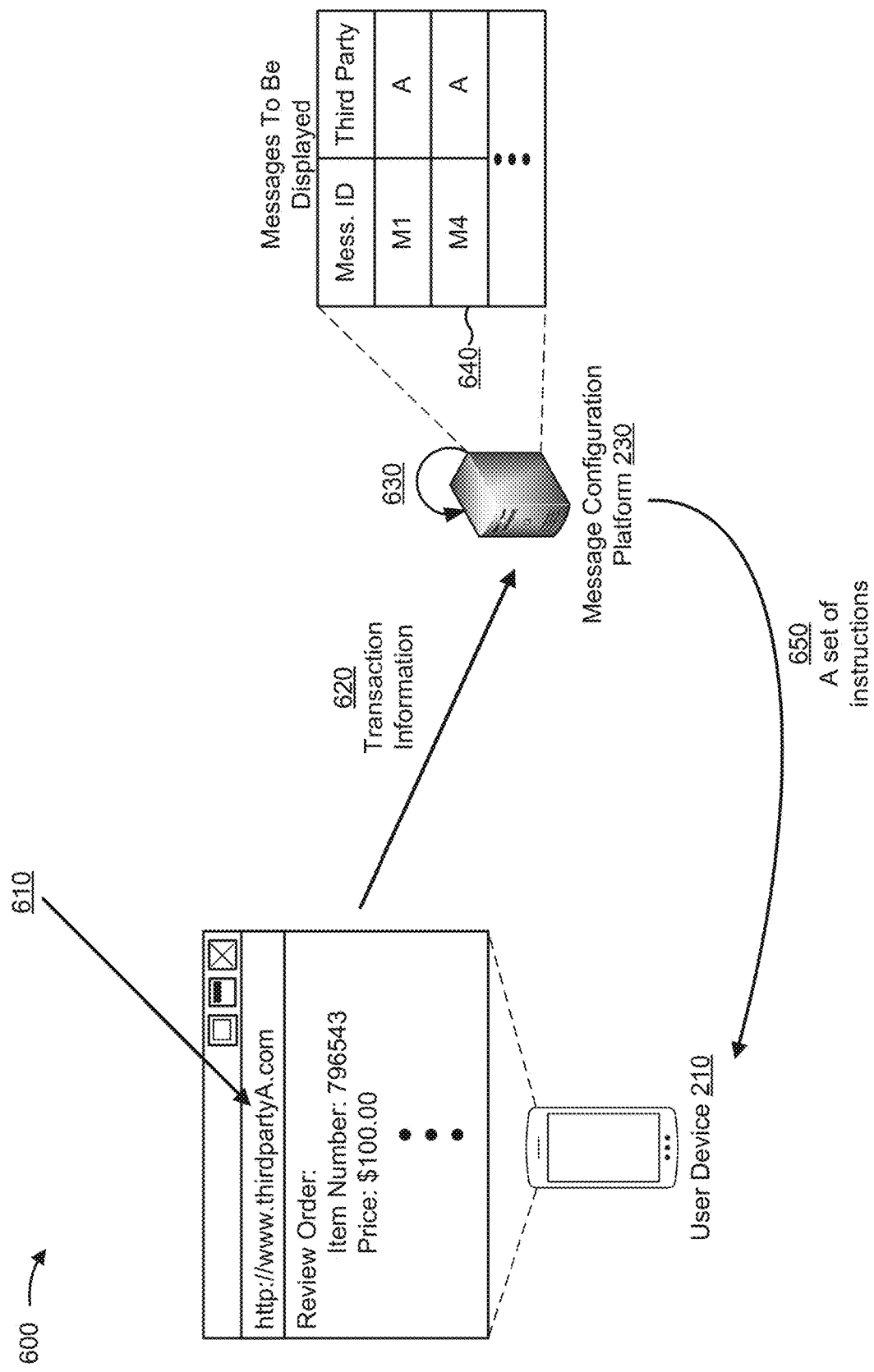

DYNAMIC RE-CONFIGURATION OF A USER INTERFACE BASED ON TRANSACTION INFORMATION

RELATED APPLICATION

This application is a continuation of U.S. patent application Ser. No. 15/922,560, filed Mar. 15, 2018 (now U.S. Pat. No. 10,135,775), which is incorporated herein by reference.

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user device to cause the user device to perform an action. Additionally, the user interface may provide information to the user.

SUMMARY

According to some possible implementations, a device may comprise one or more memories, and one or more processors, communicatively coupled to the one or more memories, configured to receive transaction information that identifies a set of third parties. The set of third parties may be associated with a set of transactions. The one or more processors may be configured to process messages in an electronic messaging account using a set of processing techniques after receiving the transaction information. The set of processing techniques may include a text processing technique, an image processing technique, an audio processing technique, or a machine learning technique. The one or more processors may be configured to identify, in the electronic messaging account, a set of messages associated with the set of third parties. The electronic messaging account may be associated with an individual associated with the set of transactions. The one or more processors may be configured to determine a manner in which to configure a user interface of an application associated with a user device to display the set of messages based on the transaction information. The user device may be associated with the individual. The one or more processors may be configured to detect that the individual has opened the application via the user device. The one or more processors may be configured to provide a set of instructions to the user device to configure the user interface of the application to display the set of messages.

According to some possible implementations, a non-transitory computer-readable medium may store one or more instructions that, when executed by one or more processors, may cause the one or more processors to receive transaction information that identifies a set of third parties. The set of third parties may be associated with a set of transactions. The one or more instructions, when executed by the one or more processors, may cause the one or more processors to process messages in an electronic messaging account using a set of processing techniques after receiving the transaction information. The messages may include a first set of messages related to the set of third parties associated with the set of transactions. The messages may include a second set of messages related another set of third parties not associated with the set of transactions.

The one or more instructions, when executed by the one or more processors, may cause the one or more processors to identify, in the electronic messaging account, the first set of messages associated with the set of third parties. The electronic messaging account may be associated with an individual associated with the set of transactions. The one or more instructions, when executed by the one or more processors, may cause the one or more processors to determine a manner in which to configure a user interface of an application associated with a user device to display the first set of messages based on the transaction information. The user device may be associated with the individual. The one or more instructions, when executed by the one or more processors, may cause the one or more processors to provide a set of instructions to the user device to configure the user interface of the application to display the first set of messages.

According to some possible implementations, a method may include receiving, by a device, transaction information related to a set of transactions. The transaction information may identify a set of third parties associated with the set of transactions. The method may include accessing, by the device and by using access information, an electronic messaging account associated with an individual with which the transaction information is associated. The method may include processing, by the device, messages in the electronic messaging account using a set of processing techniques after accessing the electronic messaging account. The method may include identifying, by the device and in the electronic messaging account, a set of messages associated with the set of third parties.

The method may include determining, by the device, a manner in which to configure a user interface of an application associated with a user device to display the set of messages based on the transaction information. The user device may be associated with the individual. The method may include detecting, by the device, that the individual has opened the application via the user device. The method may include providing, by the device, a set of instructions to the user device to configure the user interface of the application to display the set of messages. The set of instructions may cause the user interface to display a message, in the set of messages, with information relating to a transaction in the set of transactions.

BRIEF DESCRIPTION OF THE DRAWINGS

FIG. 6 is a diagram of an example implementation related to the example process shown in FIG. 4 and/or the example process shown in FIG. 5.

DETAILED DESCRIPTION

The following detailed description of example implementations refers to the accompanying drawings. The same reference numbers in different drawings may identify the same or similar elements.

An electronic account may be associated with dozens, hundreds, or thousands of messages from dozens, hundreds, or thousands of third parties. As new messages are received by the electronic messaging account, older messages are typically pushed further down, or de-prioritized, in an inbox or other folder of the electronic messaging account. When a user of the electronic messaging account needs to view a particular message, the user may have to manually input search parameters into a user interface associated with the electronic messaging account and/or manually navigate through folders of the electronic messaging account to try to locate the message. While these techniques may occasionally produce a desired message, the success of these techniques relies on the user of the electronic messaging account inputting accurate search parameters associated with the message and/or being able to recognize the message among many other messages. This consumes processing resources of devices associated with hosting and/or accessing the electronic messaging account via inefficient use of a user interface associated with the electronic messaging account. In addition, this consumes time of the user of the electronic messaging account. Further, some messages in the electronic messaging account may be relevant for or related to transactions associated with the user of the electronic messaging account, which the user may need to access at particular times, such as when contacting customer support regarding a transaction, to obtain an order number when completing an in-store pickup, and/or the like.

Some implementations, described herein, provide a message configuration platform that is capable of dynamically re-configuring a user interface to display information related to a set of messages associated with various transactions. In this way, the message configuration platform can dynamically serve message-related information to a user of a user device based on transaction information. This reduces or eliminates a need for the user to have to use a user interface to manually search through an electronic messaging account to identify messages associated with a particular transaction, thereby improving an efficiency of serving messages of an electronic messaging account to a user of the electronic messaging account. In addition, this conserves processing resources of devices that host the electronic messaging account and/or that provide access to the electronic messaging account, by reducing or eliminating inefficient use of a user interface associated with the electronic messaging account. Further, this improves an ease with which messages associated with a transaction can be accessed, thereby improving access to the messages.

Figure 1:
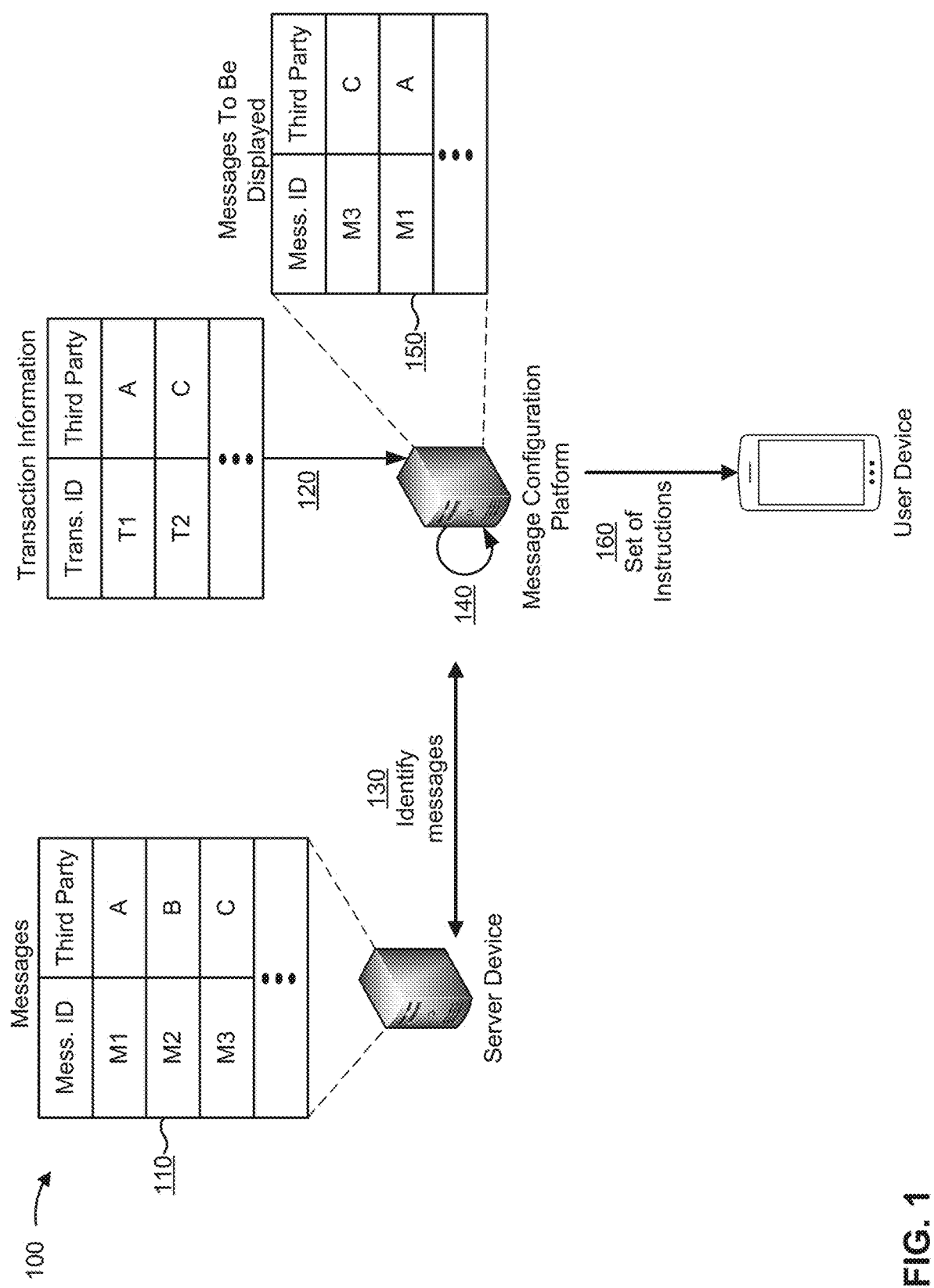
FIG. 1 is a diagram of an overview of an example implementation described herein.

FIG. 1 is a diagram of an overview of an example implementation 100 described herein. As shown in FIG. 1, implementation 100 includes a server device, a message configuration platform, and a user device.

As shown in FIG. 1, and by reference number 110, a server device may store messages associated with an electronic messaging account. For example, the server device may host the electronic messaging account. The electronic messaging account may be associated with an individual. As shown by reference number 120, the message configuration platform may receive transaction information related to a set of transactions associated with the individual. For example, the transaction information may identify a third party with which a transaction is associated, a location of a transaction, a timestamp for a transaction, a value associated with a transaction, and/or the like. The transaction information may be received from a transaction backend device (not shown), another server device, and/or the like.

Additionally, or alternatively, the message configuration platform may identify transaction information by processing an image. For example, the message configuration platform may process an image (e.g., a photograph or a scanned image) of a receipt using an image processing technique to identify transaction information in the receipt. In this way, the user interface to be configured may be separate from the electronic messaging account.

As shown by reference number 130, the message configuration platform may communicate with the server device to identify messages associated with the electronic messaging account. For example, the message configuration platform may identify a set of messages that is associated with a third party that is associated with a transaction identified in the transaction information. Continuing with the previous example, the message configuration platform may have identified the transaction information as identifying transactions T1 and T2 as being associated with third party A and third party C, respectively, which are identified in the transaction information. In this case, the message configuration platform may identify messages M1 and M3 based on those messages being associated with third party A and third party C, respectively.

The message configuration platform may perform this determination for messages associated with various types of electronic messaging accounts. For example, the message configuration platform may perform this determination across an email account, a voicemail account, a text messaging account, and/or the like, such that information related to messages from different types of electronic messaging accounts may be aggregated together in a single user interface or in a single application. In this way, a user of the user device can view messages from different types of electronic messaging accounts without having to switch between applications on the user device, thereby improving access to the messages.

A shown by reference number 140, after identifying the messages in the electronic messaging account, the message configuration platform may determine a manner in which to configure a user interface of an application to display the messages identified in the electronic messaging account. For example, the message configuration platform may determine a manner in which to configure user interface elements of the user interface. The user interface may be associated with an application, such as a messaging client, an electronic wallet, a shopping application, and/or the like.

The message configuration platform may determine a manner in which to configure the user interface based on one or more factors, such as a location of the user device, a value of a set of transactions with which a third party is associated, a timestamp of a transaction, relative to other transactions, with which a third party is associated, a timestamp of a message relative to other messages, a type of a message, an expiration date related to obtaining a refund and/or completing a return for a good and/or service, and/or the like. For example, the one or more factors may indicate a ranking for a message, and the message configuration platform may rank messages relative to each other. Continuing with the previous example, the user interface may be configured to display messages from a highest rank to a lowest rank, from a lowest rank to a highest rank, and/or the like.

As shown by reference number 150, the message configuration platform may determine that message M3 is ranked higher than message M1. In this case, the message configuration platform may determine to configure the user interface such that message M3, or multiple messages associated with third party C, are displayed higher on a list relative to message M1, or multiple messages for third party A. Similarly, and as another example, the message configuration platform may determine to configure the user interface such that message M3, or messages associated with third party C, are displayed via the user interface and that message M1, or messages associated with third party A, are not displayed via the user interface.

As shown by reference number 160, the message configuration platform may provide, to the user device, a set of instructions to configure the user interface. For example, the set of instructions may cause message M3, or messages associated with third party C, to be displayed, to be displayed higher on a list of messages relative to message M1, or messages associated with third party A, and/or the like.

In this way, the message configuration platform may monitor transaction information related to an individual associated with a user device and may dynamically re-configure a manner in which messages of an electronic messaging account are provided for display via a user interface. This reduces an amount of time needed to access a message in an electronic messaging account that is associated with a transaction. In addition, this reduces or eliminates a need for a user to have to perform one or more searches of the electronic messaging account using a user interface associated with the electronic messaging account to identify a set of messages associated with a transaction. Further, this improves access to, and/or use of, information in messages, by facilitating easier and quicker access to the messages.

As indicated above, FIG. 1 is provided merely as an example. Other examples are possible and may differ from what was described with regard to FIG. 1. For example, although FIG. 1 was described with regard to a message configuration platform, some functions of the message configuration platform may be performed by the user device (e.g., an application on the user device) and/or the server device.

Figure 2:
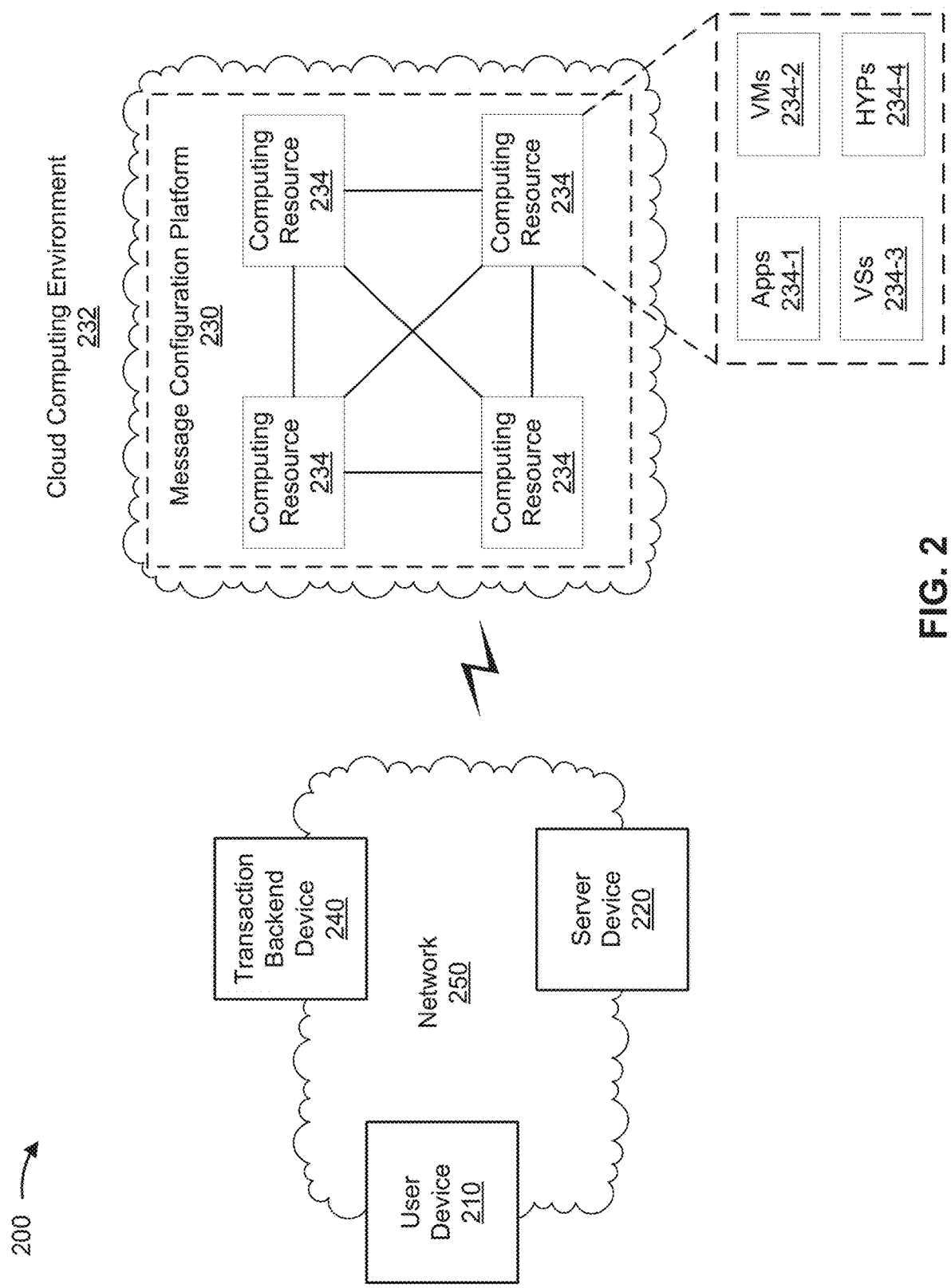
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a message configuration platform 230 within a cloud computing environment 232 that includes a set of computing resources 234, a transaction backend device 240, and a network 250. Devices of environment 200 may interconnect via wired connections, wireless connections, or a combination of wired and wireless connections.

User device 210 includes one or more devices capable of receiving, generating, storing, processing, and/or providing information associated with configuring a user interface based on transaction information associated with an individual. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may provide, to message configuration platform 230, transaction information related to an individual associated with user device 210, as described elsewhere herein. Additionally, or alternatively, user device 210 may receive, from message configuration platform 230, a set of instructions for configuring a user interface based on the transaction information, as described elsewhere herein.

Server device 220 includes one or more devices capable of receiving, generating, storing, processing, and/or providing information associated with transaction, such as transaction information, or associated with an electronic messaging account. For example, server device 220 may include a server (e.g., in a data center or a cloud computing environment), a data center (e.g., in a multi-server micro data center), a workstation computer, a virtual machine (VM) provided in a cloud computing environment, or a similar type of device. In some implementations, server device 220 may host an electronic messaging account, as described elsewhere herein. Additionally, or alternatively, server device 220 may provide, to message configuration platform 230, transaction information for a set of transactions, as described elsewhere herein.

Message configuration platform 230 includes one or more devices capable of receiving, generating, storing, processing, and/or providing information associated with configuring a user interface to display information related to a set of messages. For example, message configuration platform 230 may include a cloud server or a group of cloud servers. In some implementations, message configuration platform 230 may be designed to be modular such that certain software components can be swapped in or out depending on a particular need. As such, message configuration platform 230 may be easily and/or quickly reconfigured for different uses.

In some implementations, as shown in FIG. 2, message configuration platform 230 may be hosted in cloud computing environment 232. Notably, while implementations described herein describe message configuration platform 230 as being hosted in cloud computing environment 232, in some implementations, message configuration platform 230 may not be cloud-based (i.e., may be implemented outside of a cloud computing environment) or may be partially cloud-based.

Cloud computing environment 232 includes an environment that hosts message configuration platform 230. Cloud computing environment 232 may provide computation, software, data access, storage, and/or other services that do not require end-user knowledge of a physical location and configuration of a system and/or a device that hosts message configuration platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host message configuration platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with message configuration platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction backend device 240 includes one or more devices capable of authorizing and/or facilitating a transaction. For example, transaction backend device 240 may include one or more servers and/or computers to store and/or provide information associated with processing a transaction via a transaction terminal. In some implementations, transaction backend device 240 may provide, to message configuration platform 230, transaction information for a set of transactions related to an individual, as described elsewhere herein.

Transaction backend device 240 may include one or more devices associated with a financial institution (e.g., a bank, a lender, a credit union, etc.) and/or a transaction card association that authorizes a transaction and/or facilitates a transfer of funds or payment between an account associated with a cardholder of a transaction card and an account of an individual or business associated with a transaction terminal. For example, transaction backend device 240 may include one or more devices of one or more issuing banks associated with a cardholder of a transaction card, one or more devices of one or more acquiring banks (or merchant banks) associated with a transaction terminal, and/or one or more devices associated with one or more transaction card associations (e.g., VISA®, MASTERCARD®, and/or the like) associated with a transaction card. Accordingly, based on receiving information associated with a transaction card from a transaction terminal, devices of transaction backend device 240 (e.g., associated with a financial institution or transaction card association) may communicate to authorize a transaction and/or transfer funds between the accounts associated with a transaction card and/or a transaction terminal.

Transaction backend device 240 may provide or deny authorization associated with a transaction. For example, transaction backend device 240 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with a transaction card and/or provided by a transaction terminal.

Transaction backend device 240 may include one or more devices associated with a rewards program associated with a transaction card and/or an entity (e.g., a financial institution, a merchant, a service provider, a vendor, and/or the like) associated with a transaction card and/or a transaction terminal. For example, transaction backend device 240 may authorize the earning and/or redemption of rewards (e.g., rewards points associated with a transaction card, cash rewards, client loyalty rewards associated with an entity associated with a transaction terminal, and/or the like) based on a transaction processed by a transaction terminal.

Network 250 includes one or more wired and/or wireless networks. For example, network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
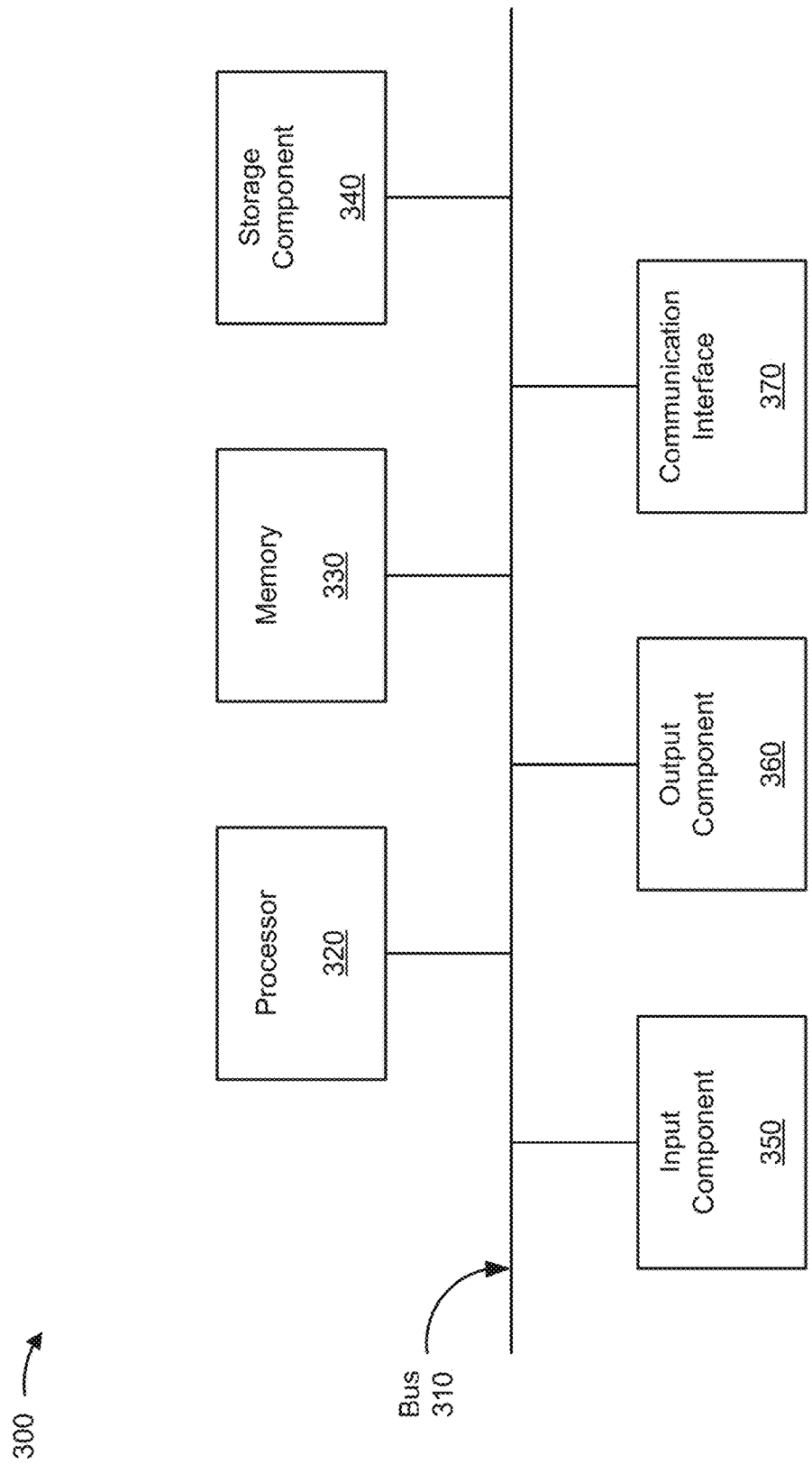
FIG. 3 is a diagram of example components of one or more devices of FIG. 2.

FIG. 3 is a diagram of example components of a device 300. Device 300 may correspond to user device 210, server device 220, message configuration platform 230, computing resource 234, and/or transaction backend device 240. In some implementations, user device 210, server device 220, message configuration platform 230, computing resource 234, and/or transaction backend device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
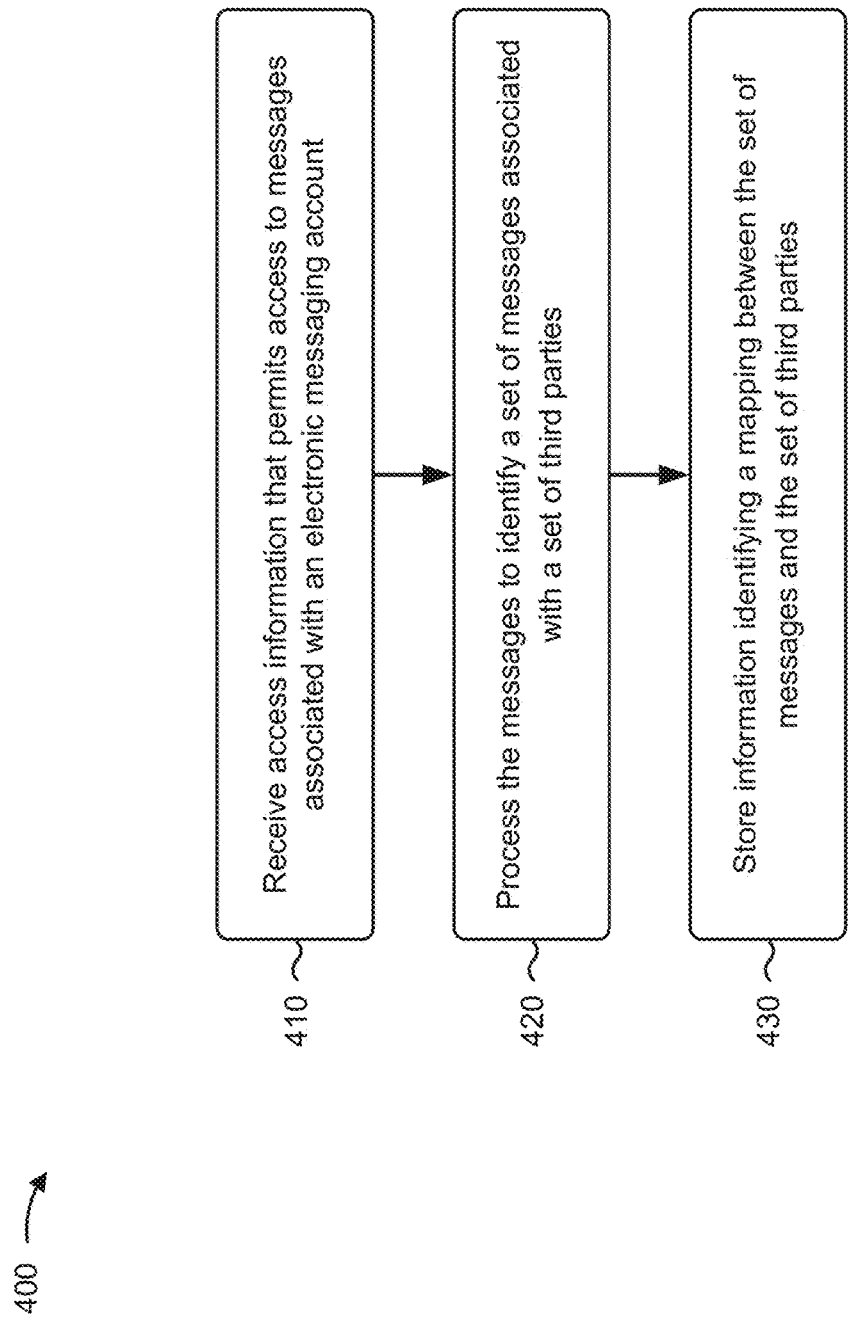
FIG. 4 is a flow chart of an example process for dynamic re-configuration of a user interface based on transaction information.

FIG. 4 is a flow chart of an example process 400 for dynamic re-configuration of a user interface based on transaction information. In some implementations, one or more process blocks of FIG. 4 may be performed by message configuration platform 230. In some implementations, one or more process blocks of FIG. 4 may be performed by another device or a group of devices separate from or including message configuration platform 230, such as user device 210, server device 220, computing resource 234, and transaction backend device 240.

As shown in FIG. 4, process 400 may include receiving access information that permits access to messages associated with an electronic messaging account (block 410). For example, message configuration platform 230 may receive (e.g., using computing resource 234, processor 320, communication interface 370, and/or the like) access information that permits access to messages associated with an electronic messaging account. In some implementations, message configuration platform 230 may receive the access information based on requesting the access information, based on a user of user device 210 inputting the access information (e.g., via a user interface, an application executing on user device 210, etc.), and/or the like.

In some implementations, the access information may include a set of credentials associated with an electronic messaging account, a username/password combination, a security token (e.g., that provides limited access to an electronic messaging account), and/or the like. For example, the access information may permit message configuration platform 230 to access messages associated with an electronic messaging account (e.g., for a limited amount of time, stored in a particular folder associated with the electronic messaging account, such as an inbox or a spam folder, etc.).

In some implementations, a message may include an email, a text message, an instant message, a voicemail, a push notification, and/or the like. In some implementations, an electronic messaging account may include an email account, an instant messaging account, a text messaging account, a voicemail account, and/or the like. In some implementations, server device 220 may host the electronic messaging account (e.g., may store a message, may store information used to verify access information, etc.). In some implementations, message configuration platform 230 may host the electronic messaging account (e.g., may store a message, may store information used to verify access information, etc.), in which case, message configuration platform 230 may not need to receive the access information to access the electronic messaging account. In some implementations, an electronic messaging account may be associated with one or more messages.

In some implementations, message configuration platform 230 may receive the access information related to accessing the electronic messaging account prior to processing a message associated with the electronic messaging account. In some implementations, message configuration platform 230 may access the electronic messaging account by providing, to another device (e.g., server device 220), the access information after receiving the access information.

In some implementations, message configuration platform 230 may receive access information for another type of account. For example, message configuration platform 230 may receive access information for a transaction account, such as a bank account or a mobile payment account. In some implementations, message configuration platform 230 may use the access information for the transaction account to receive transaction information, as described elsewhere herein.

In some implementations, user device 210 may receive access information rather than message configuration platform 230. For example, a user of user device 210 may input access information into a user interface of an application installed on user device 210.

In this way, message configuration platform 230 may receive access information that permits access to messages prior to processing the messages.

As further shown in FIG. 4, process 400 may include processing the messages to identify a set of messages associated with a set of third parties (block 420). For example, message configuration platform 230 may process (e.g., using computing resource 234, processor 320, and/or the like) the messages to identify a message associated with a third party or a set of messages associated with a set of third parties.

In some implementations, a third party may include a party not associated with the electronic messaging account, user device 210, and/or message configuration platform 230. For example, a third party may include an organization, such as a business, or an individual. In some implementations, an individual associated with user device 210 and/or the electronic messaging account may transact with a third party and the electronic messaging account associated with the individual may receive a message or set of messages from a device associated with the third party.

In some implementations, message configuration platform 230 may process a message associated with the electronic messaging account to identify an identifier that identifies a third party with which the message is associated. For example, the identifier may include a name of an organization, a name of a loyalty/rewards/membership program, a domain name, a telephone number, an email address, and/or the like. In some implementations, message configuration platform 230 may analyze metadata or other data associated with the message to identify the identifier.

In some implementations, message configuration platform 230 may process multiple messages associated with the electronic messaging account based on receiving the access information. In some implementations, message configuration platform 230 may identify, based on processing the multiple messages, particular information in one or more of the multiple messages. For example, the particular information may include domain information (e.g., a domain name) for a third party and/or or information that identifies the third party, such as a name of the third party, a logo of the third party, and/or the like.

In some implementations, message configuration platform 230 may process text associated with a message using a text processing technique, such as a natural language processing technique, a text analysis technique, a computational linguistics technique, and/or the like. For example, message configuration platform 230 may process text to identify a term, a phrase, a symbol, and/or the like included in a message. Additionally, or alternatively, message configuration platform 230 may process audio associated with a message using an audio processing technique, such as a speech-to-text technique, an automatic speech recognition (ASR) technique, a computer speech recognition technique, and/or the like. For example, message configuration platform 230 may process audio to identify a term and/or phrase included in the audio. Additionally, or alternatively, message configuration platform 230 may process an image associated with a message using an image processing technique, such as a computer vision technique, an optical character recognition (OCR) technique, a feature detection technique, and/or the like. For example, message configuration platform 230 may process an image to identify a term, a phrase, a symbol, a logo, and/or the like included in an image in a message.

As a specific example, in some implementations, message configuration platform 230 may process a message to identify a domain name that includes an identifier associated with a third party (e.g., a name of the third party, a website of the third party, etc.). Additionally, or alternatively, and as another example, message configuration platform 230 may process a message to identify text that includes an identifier associated with a third party. Additionally, or alternatively, and as another example, message configuration platform 230 may process a message to identify an image that includes an identifier associated with a third party, such as a logo.

In some implementations, message configuration platform 230 may identify messages associated with the electronic messaging account prior to processing one or more of the messages. For example, message configuration platform 230 may identify messages in an inbox, or another folder, of the electronic messaging account, messages that have been archived, and/or the like.

In some implementations, message configuration platform 230 may determine that one or more of the messages are to be processed and/or that one or more other messages are not to be processed based on information associated with the one or more messages and/or the one or more other messages. For example, message configuration platform 230 may identify messages that have been tagged as private by a user of user device 210 (e.g., indicating that the messages are not to be processed). In some implementations, message configuration platform 230 may process only those messages associated with a third party identifier identified on a list of third party identifiers approved for processing (e.g., a whitelist). Conversely, in some implementations, message configuration platform 230 may process messages associated with any third party identifier except messages associated with a third party identifier included in a list of prohibited third party identifiers (e.g., a blacklist).

Additionally, or alternatively, and as another example, message configuration platform 230 may use a machine learning technique to identify messages that are to be processed and/or that are not to be processed (e.g., messages that are likely to be personal messages or messages that an owner of the electronic messaging account would want to be kept private). Continuing with the previous example, message configuration platform 230 may use a machine learning technique to identify messages that are to be processed and/or that are not to be processed based on terms and/or phrases included in the subjects of the messages (e.g., where the terms and/or phrases indicate that the messages are likely personal messages that a user associated with the electronic messaging account would want to be kept private), a quantity of messages exchanged in a chain of messages (e.g., where a threshold quantity of messages may indicate that the messages are personal), and/or the like.

As a specific example, by using a machine learning technique, message configuration platform 230 may be capable of distinguishing between messages that are from a third party and messages that are merely related to the third party. Continuing with the previous example, message configuration platform 230 may be capable of distinguishing between an order confirmation from a third party retailer and an email that includes a news article related to the third party retailer. Additionally, or alternatively, message configuration platform 230 may use a machine learning technique to distinguish between different types of messages for a third party. For example, message configuration platform 230 may use a machine learning technique to distinguish between an order confirmation from a third party, a coupon offer from the third party, a spam message from the third party, and/or the like. This facilities prioritization of messages associated with a third party (described below).

In some implementations, this distinction may be based on a score that message configuration platform 230 associates with different messages. For example, the score may indicate a likelihood that a message is from a third party or is relevant to a transaction with the third party (rather than merely being associated with the third party, as in a news article) and may be based on combinations of terms and/or phrases included in the message, a source of the message (e.g., a domain name associated with the message), a quantity of words in the message, and/or the like. Message configuration platform 230 may have been trained on a training set of data that identifies messages likely to be from a third party, such as order confirmations, coupon offers, and/or account updates, and messages merely associated with the third party, such as new articles, phishing emails, spam, and/or the like.

This improves processing of messages and/or conserves processing resources of message configuration platform 230 by reducing a quantity of messages that message configuration platform 230 processes. Further, using a machine learning technique facilitates processing of structured or unstructured data related to the messages, thereby reducing or eliminating a need for manual review by a human actor. Further, this facilitates processing of hundreds, thousands, millions, or more messages, thereby facilitating processing of a higher quantity of messages and/or in a shorter amount of time than a human actor. Further, this facilitates objective processing of information where a human actor would process information in a subjective manner, thereby improving a consistency and/or reliability of a result of processing the information.

Additionally, or alternatively, and as additional examples, message configuration platform 230 may identify messages that are not to be processed based on the messages being from particular sources (e.g., identified in a data structure input by a user of user device 210), a folder into which the messages are organized, a set of rules, and/or the like. In some implementations, message configuration platform 230 may process the one or more messages after determining that the one or more messages are to be processed.

In some implementations, message configuration platform 230 may identify a match between an identifier for a third party (e.g., a third party identifier) included in a message and another identifier for the third party identifier associated with a set of transactions. For example, message configuration platform 230 may identify a match between a domain name of a third party associated with a message and a name of the third party associated with a transaction (e.g., as shown on a bank statement). In some implementations, message configuration platform 230 may identify the match by performing a lookup of the third party identifier from the message in a data structure and identifying a corresponding identifier for the third party associated with the set of transactions where a result of the lookup indicates a match.

Additionally, or alternatively, message configuration platform 230 may match a root of a third party identifier associated with a message and a root of an identifier associated with a set of transactions. For example, the root of the domain name "thirdpartyA.com" might be "thirdpartyA," which message configuration platform 230 matches to the identifier "ThirdPartyA, Inc." associated with a set of transactions. Additionally, or alternatively, message configuration platform 230 may perform a search of the third party identifier associated with a message and may identify a result that is within a threshold similarity of the third party identifier.

By identifying a match between an identifier associated with a message and an identifier associated with transaction information, message configuration platform 230 can identify transactions associated with a third party. This conserves processing resources of message configuration platform 230 by providing a quick and easy way for message configuration platform 230 to identify a transaction associated with a third party.

In some implementations, message configuration platform 230 may be capable of distinguishing between different types of messages from thirdpartyA. For example, message configuration platform 230 may distinguish between messages that include transaction information (e.g., an order confirmation message, a receipt, etc.) and messages that include offers, advertisements, and/or the like (e.g., a spam message, a coupon message, etc.).

In some implementations, message configuration platform 230 may tag a message after processing the message. For example, message configuration platform 230 may tag a message with another identifier (e.g., based on a match between an identifier included in the message and a set of identifiers associated with a set of transactions). For example, the other identifier may identify the message as being associated with a third party. In some implementations, by tagging a message, message configuration platform 230 may form a tagged message. In some implementations, message configuration platform 230 may tag a message to identify the message as a particular type of message. For example, message configuration platform 230 may tag the message as a spam message, as a receipt, as an order confirmation, as including transaction information, and/or the like.

In some implementations, message configuration platform 230 may tag a message within an electronic messaging account. In some implementations, message configuration platform 230 may configure a flag, a label, and/or the like associated with a message to tag a message. Additionally, or alternatively, message configuration platform 230 may store information identifying tagged messages (e.g., in server device 220). In some implementations, message configuration platform 230 may store, in a data structure, information identifying a message to tag the message. Additionally, or alternatively, server device 220 (e.g., on which messages are stored) may store information identifying tagged messages.

In some implementations, message configuration platform 230 may process transaction information, described in more detail elsewhere herein, in a similar manner. For example, message configuration platform 230 may process transaction information using a natural language processing technique, an audio processing technique, an image processing technique, a machine learning technique, and/or the like in a similar manner. Continuing with the previous example, message configuration platform 230 may process transaction information to identify a transaction identifier that identifies a transaction, a third party identifier that identifies a third party associated with a transaction, an amount of a transaction, a location of a transaction, a timestamp for a transaction, an expiration date for obtaining a refund or completing a return of a good and/or service, and/or the like. In some implementations, message configuration platform 230 may use a result of processing transaction information to map a transaction and a message to third party, as described in more detail elsewhere herein.

In this way, message configuration platform 230 may process the messages to identify a set of messages associated with a set of third parties prior to storing information identifying a mapping between the set of messages and the set of third parties.

As further shown in FIG. 4, process 400 may include storing information identifying a mapping between the set of messages and the set of third parties (block 430). For example, message configuration platform 230 may store (e.g., using computing resource 234, processor 320, memory 330, storage component 340, and/or the like) information identifying a mapping between the set of messages and the set of third parties.

In some implementations, message configuration platform 230 may store information that identifies a mapping between an identifier that identifies a message and an identifier that identifies a third party. For example, message configuration platform 230 may store the information in a data structure.

In some implementations, message configuration platform 230 may store a data structure that includes a mapping between an identifier for a third party extracted from a message and another identifier for the third party extracted from transaction information. For example, the data structure may include an identifier from a domain name (e.g., "thirdpartyA" from the domain name "thirdpartyA.com") and a corresponding identifier from the transaction information for the third party, such as "Third Party A." In some implementations, the data structure may include information identifying a set of messages associated with the third party and/or a set of transaction associated with the third party. This facilitates fast and easy identification of messages and/or transactions associated with a third party, thereby reducing an amount of time needed to identify messages and/or transactions associated with a third party and/or conserving processing resources associated with identifying messages and/or transactions associated with the third party. In some implementations, message configuration platform 230 may store information identifying the mapping in server device 220.

In this way, message configuration platform 230 may store information identifying a mapping between the set of messages and the set of third parties.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
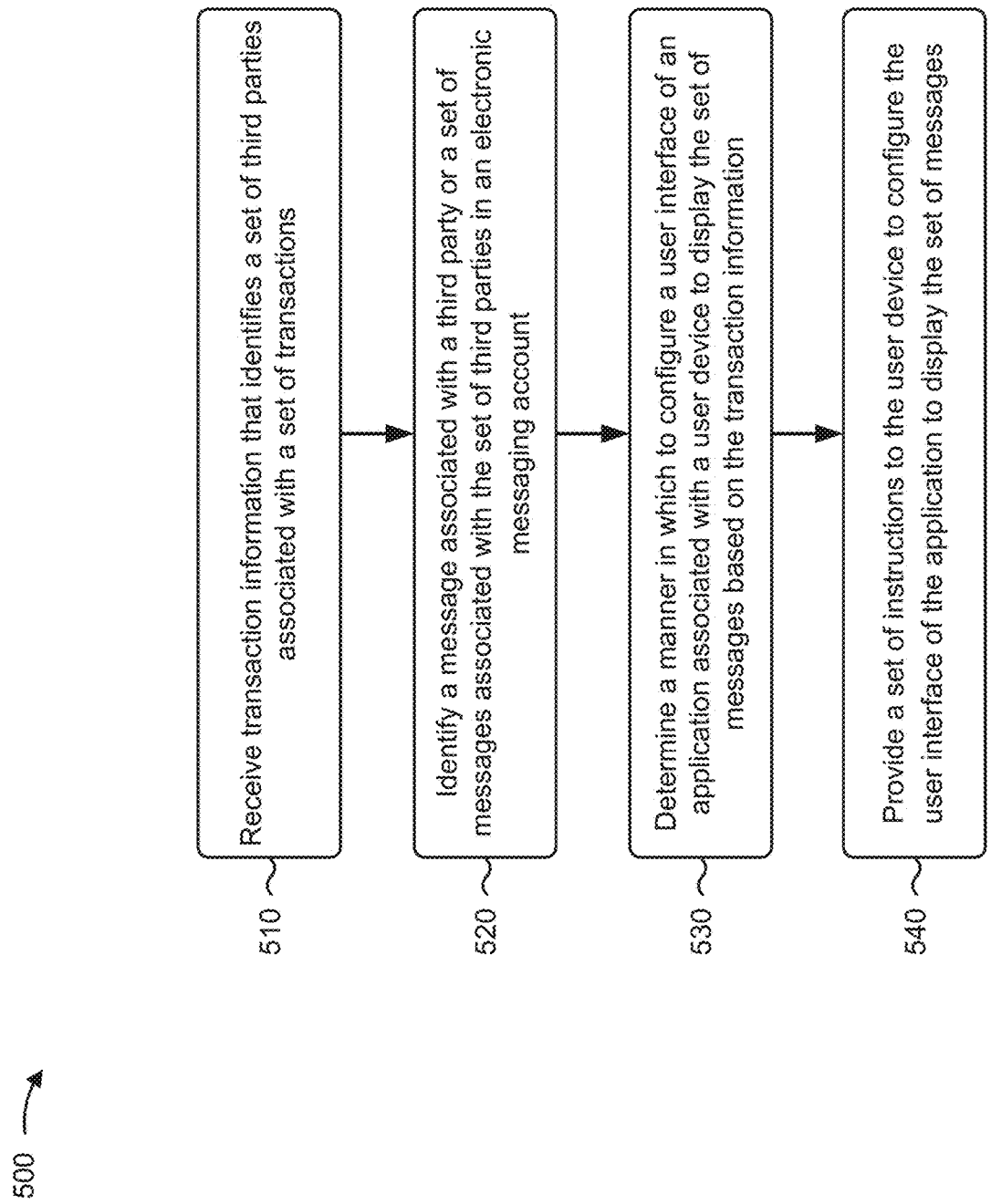
FIG. 5 is a flow chart of an example process for dynamic re-configuration of a user interface based on transaction information.

FIG. 5 is another flow chart of another example process 500 for dynamic re-configuration of a user interface based on transaction information. In some implementations, one or more process blocks of FIG. 5 may be performed by message configuration platform 230. In some implementations, one or more process blocks of FIG. 5 may be performed by another device or a group of devices separate from or including message configuration platform 230, such as user device 210, server device 220, computing resource 234, and transaction backend device 240.

As shown in FIG. 5, process 500 may include receiving transaction information that identifies a set of third parties associated with a set of transactions (block 510). For example, message configuration platform 230 may receive (e.g., using computing resource 234, processor 320, communication interface 370, and/or the like) transaction information that identifies a set of third parties associated with a set of transactions. In some implementations, message configuration platform 230 may receive transaction information from transaction backend device 240, based on requesting the transaction information, periodically, according to a schedule, in real-time or near real-time, and/or the like. In some implementations, message configuration platform 230 may receive thousands, millions, or more data elements when receiving transaction information, thereby receiving a data set that cannot be processed manually or objectively (e.g., in a consistent manner) by a human actor.

In some implementations, message configuration platform 230 may access and process transaction information on transaction backend device 240 rather than receiving the transaction information. This conserves processing resources of message configuration platform 230 and/or conserves network resources of network 250.

In some implementations, transaction information may be related to a set of transactions. For example, transaction information may identify a set of transactions, a location of a transaction, parties associated with a transaction (e.g., an owner of a transaction account and a third party with which the owner is transacting), a value of a transaction, a type of a transaction (e.g., a retail transaction, a grocery transaction, etc.), and/or the like. In some implementations, transaction information may be associated with a transaction account for an individual. For example, a transaction account may include a bank account, a credit account, a mobile payment account, and/or the like.

In some implementations, user device 210, rather than message configuration platform 230, may receive transaction information. For example, user device 210 may access transaction information via an application installed on user device 210.

In this way, message configuration platform 230 may receive transaction information prior to identifying a set of messages associated with a set of third parties.

As further shown in FIG. 5, process 500 may include identifying a message associated with a third party or a set of messages associated with the set of third parties in an electronic messaging account (block 520). For example, message configuration platform 230 may identify (e.g., using computing resource 234, processor 320, memory 330, storage component 340, communication interface 370, and/or the like) a message associated with a third party or a set of messages associated with the set of third parties in an electronic messaging account. In some implementations, the electronic messaging account may be associated with an individual associated with the set of transactions (e.g., an individual that owns a transaction account that is used to complete the set of transactions with the set of third parties).

In some implementations, message configuration platform 230 may identify the message or set of messages by processing information in a data structure. For example, message configuration platform 230 may process a data structure that includes information that identifies third parties (e.g., third party identifiers) and a set of messages associated with each of the third parties. Continuing with the previous example, message configuration platform 230 may perform a lookup of a third party identifier in the data structure and may identify corresponding messages when a result of the lookup indicates a match. In some implementations, message configuration platform 230 may identify the messages by processing a data structure stored by message configuration platform 230. Additionally, or alternatively, message configuration platform 230 may provide a third party identifier to server device 220 as a search parameter for a search of messages corresponding to the third party identifier (e.g., in a data structure stored by server device 220, in an electronic messaging account hosted by server device 220, etc.).

In some implementations, message configuration platform 230 may identify a set of third party identifiers in transaction information prior to identifying the set of messages (e.g., a set of third party identifiers associated with a set of transactions identified by the transaction information). For example, message configuration platform 230 may identify the set of third party identifiers based on processing the transaction information using a text processing technique, an audio processing technique, an image processing technique, a machine learning technique, and/or the like, as described above.

In some implementations, message configuration platform 230 may have mapped the messages to a set of third party identifiers prior to identifying the messages. For example, message configuration platform 230 may have stored, in a data structure, information identifying a set of messages and a corresponding third party (e.g., based on identifying a third party identifier associated with the message). In some implementations, message configuration platform 230 may identify the set of messages after mapping the messages to the set of third party identifiers.

In some implementations, user device 210, rather than message configuration platform 230, may identify a set of messages associated with a set of third parties. For example, an application installed on user device 210 may identify the messages. For example, the application may be a messaging client, or an application different than a messaging client, such as an application that stores or accesses transaction information from scanned or photographed receipts, for example. Additionally, or alternatively, and as another example, the application may be an electronic wallet, a shopping application, and/or the like.

In this way, message configuration platform 230 may identify a set of messages prior to determining a manner in which to display the set of messages.

As further shown in FIG. 5, process 500 may include determining a manner in which to configure a user interface of an application associated with a user device to display the set of messages based on the transaction information (block 530). For example, message configuration platform 230 may determine (e.g., using computing resource 234, processor 320, and/or the like) a manner in which to configure a user interface of an application associated with user device 210 to display the set of messages based on the transaction information.

In some implementations, message configuration platform 230 may determine a manner in which to configure a set of user interface elements (e.g., buttons, text boxes, menus, etc.) of the user interface. For example, message configuration platform 230 may determine to configure user interface elements of the user interface to display information related to a set of messages organized by third party. Continuing with the previous example, a set of user interface elements may be configured to display a first set of messages associated with a third party together (e.g., in a list, in a group, under an icon for the third party, etc.) and may be configured to display a second set of messages associated with another third party together.

In some implementations, message configuration platform 230 may determine to prioritize a first set of messages higher relative to a second set of messages based on the transaction information. For example, message configuration platform 230 may determine to prioritize the first set of messages higher based on a value of a first set of transactions associated with the first set of messages relative to a value of a second set of transactions associated with the second set of messages, a timestamp for the first set of transactions relative to the second set of transactions, third parties associated with the first and second sets of transactions (e.g., different third parties), locations of the first and second sets of transactions, and/or the like.

In some implementations, message configuration platform 230 may determine a manner in which to configure the user interface after determining to prioritize a first set of messages higher relative to the second set of messages. For example, message configuration platform 230 may determine to configure a user interface to display the first set of messages toward a top of the user interface and the second set of messages below the first set of messages, to display the first set of messages but not the second set of messages, to display a folder for the first set of messages above a folder for the second set of messages, and/or the like.

In some implementations, message configuration platform 230 may determine a score for each of a set of third parties based on transaction information. For example, message configuration platform 230 may determine a score for a third party based on one or more factors that include timestamps for a set of transactions related to the third party, a quantity of transactions associated with the third party, a location of a transaction associated with the third party, a value of a set of transactions associated with the third party, and/or the like. Continuing with the previous example, message configuration platform 230 may determine a higher score for a third party relative to another third party where the third party is associated with a more recent transaction, a higher value transaction, a location that is closer to a location of user device 210 associated with the individual (e.g., based on information that identifies a location of user device 210, the third party, and/or the other third party), and/or the like.

In some implementations, message configuration platform 230 may determine a score for each of a set of messages associated with a third party. For example, message configuration platform 230 may determine the score for a message based on one or more factors that include terms and/or phrases included in the message, a timestamp for when the electronic messaging account received the message, an identity associated with the message (e.g., a no-reply identity, a customer support identity, etc.), a type of the message (e.g., an order confirmation, a spam message, etc.), and/or the like. Continuing with the previous example, message configuration platform 230 may determine a higher score for a first message relative to a second message based on the first message having been received more recently relative to the second message, based on the first message being an order confirmation where the second message is a spam message, and/or the like.

In some implementations, message configuration platform 230 may determine the manner in which to configure the user interface based on the score for each of the set of third parties. For example, message configuration platform 230 may determine to configure the user interface to display messages for third parties that are associated with a threshold score, to display messages for a third party associated with the highest score relative to other third parties, to display messages for third parties organized from the top of the user interface to the bottom of the user interface (from highest score to lowest score or lowest score to highest score), and/or the like. In some implementations, message configuration platform 230 may determine a manner in which to configure a user interface to display messages associated with a particular third party based on a score associated with each of the messages (as determined in a similar manner).

In some implementations, message configuration platform 230 may determine a ranking for each of the set of third parties based on the score for each of the set of third parties. For example, message configuration platform 230 may rank each of the set of third parties from highest score to lowest score, from lowest score to highest score, based on an average score over a time period, and/or the like. In some implementations, message configuration platform 230 may determine the manner in which to configure the user interface based on the ranking for the set of third parties. For example, message configuration platform 230 may determine to configure the user interface to display messages for a third party with the highest rank relative to other ranks, to display messages for third parties that have a threshold rank (e.g., where messages for the third party with the highest rank are displayed at the top of the user interface and messages for other third parties are displayed below the messages for the third party), and/or the like. In some implementations, message configuration platform 230 may determine a manner in which to configure a user interface for messages associated with a particular third party based on scores for the messages in a similar manner.

In some implementations, message configuration platform 230 may determine a manner in which to configure a user interface based on other information related to an individual associated with user device 210. For example, the other information may include schedule information, from an electronic calendar, related to a scheduled delivery of a good or service, a scheduled appointment for the individual, a scheduled pick up time for a good, and/or the like. Continuing with the previous example, message configuration platform 230 may prioritize display of messages related to a scheduled event, relative to other messages, within a threshold amount of time of the scheduled event. In some implementations, this may be one factor that message configuration platform 230 uses to determine a manner in which to configure a user interface.

In some implementations, message configuration platform 230 may determine a manner in which to configure a user interface based on other information. For example, message configuration platform 230 may determine the manner in which to configure the user interface based on detecting that user device 210 is at a particular third party location (e.g., a retail location). Continuing with the previous example, message configuration platform 230 may determine the location of user device 210 based on GPS information from user device 210, input by a user of user device 210, and/or the like.

Additionally, or alternatively, and as another example, message configuration platform 230 may determine a manner in which to configure a user interface based on determining that a user of user device 210 is attempting to contact a customer service department associated with a third party. Continuing with the previous example, message configuration platform 230 may receive, from user device 210, information that identifies a domain name and/or identity (e.g., a customer service identity associated with the domain name) to which a user of user device 210 has sent a message, a phone number to which a user of user device 210 is calling (e.g., a phone number for a customer service department), and/or the like. In some implementations, message configuration platform 230 may provide, for display via a user interface, information for a customer service department in association with providing information related to a message for display.

In some implementations, message configuration platform 230 may determine that a user interface is to display various types of information for a third party and/or a transaction. For example, message configuration platform 230 may determine to display transaction information for a transaction, a receipt for the transaction, an offer associated with the third party with which the transaction is associated, and/or the like on a user interface. Continuing with the previous example, message configuration platform 230 may identify transactions, receipts, offers, and/or the like that are associated with the same transaction and/or third party based on identifying one or more identifiers in the transaction information and/or various messages, such as one or more identifiers that identify a transaction, a third party, and/or the like. In this way, message configuration platform 230 may determine to configure a user interface in a manner that provides information, from different messaging accounts, for display so that the information is quickly and easily accessible in an aggregated manner.

In some implementations, a message may be associated with an electronic receipt (e.g., may include the electronic receipt in the body of the message, may include the electronic receipt as an attachment. etc.). In this case, message configuration platform 230 and/or user device 210 may cause a notification to be associated with a transaction (e.g., in an electronic banking application), such that when a user of user device 210 selects the transaction via a user interface, the message with the electronic receipt can be provided for display via the application.

In some implementations, message configuration platform 230 may detect that the individual has opened an application via user device 210 prior to determining a manner in which to configure the user interface. For example, the application may be an email client, a mobile banking application, and/or the like. In some implementations, user device 210 on which the application is installed may detect that the application has been opened and may send, to message configuration platform 230, a notification that the application has been opened. In this way, message configuration platform 230 may detect that an application installed on user device 210 has been opened.

In some implementations, if the application is a messaging client, message configuration platform 230 may provide the set of instructions to configure a user interface associated with the application via an application programming interface (API) associated with the messaging client. In some implementations, the set of instructions may identify messages using identifiers that are readable by the messaging client and may identify a manner in which to display the messages. Additionally, or alternatively, the set of instructions may identify labels used by the messaging client associated with messages and a manner in which to display messages associated with each of the labels.

In some implementations, message configuration platform 230 may not determine a manner in which to configure the user interface until message configuration platform 230 detects that the application on user device 210 has been opened. This conserves processing resources of message configuration platform 230 by preventing message configuration platform 230 from determining a manner in which to configure the user interface until information related to the messages has been requested by a user of user device 210.

In some implementations, user device 210, rather than message configuration platform 230, may determine a manner in which to configure a user interface. For example, an application installed on user device 210 may determine a manner in which to configure the user interface of the application.

In this way, message configuration platform 230 may determine a manner in which to configure a user interface prior to providing a set of instructions to configure the user interface.

As further shown in FIG. 5, process 500 may include providing a set of instructions to the user device to configure the user interface of the application to display the set of messages (block 540). For example, message configuration platform 230 may provide (e.g., using computing resource 234, processor 320, communication interface 370, and/or the like) a set of instructions to user device 210 to configure the user interface of the application to display the set of messages. In some implementations, message configuration platform 230 may provide the set of instructions after receiving the information that indicates that an application installed on user device 210 has been opened. This conserves processing resources of message configuration platform 230 by reducing or eliminating a need for message configuration platform 230 to provide the set of instructions until the user interface needs to be configured.

In some implementations, message configuration platform 230 may provide, to user device 210, the set of instructions to configure user interface elements of the user interface based on a ranking of third parties and/or messages. For example, the user interface elements may display text related to the messages.

In some implementations, message configuration platform 230 may monitor the transaction information to determine whether the transaction information has been updated. In some implementations, message configuration platform 230 may determine another manner in which to configure the user interface after determining that the transaction information has been updated (e.g., to form updated transaction information).

In some implementations, user device 210, rather than message configuration platform 230, may perform these or similar actions. For example, an application on user device 210 may configure user interface elements of a user interface associated with the application to display the messages, or information related to the messages, in a particular manner. Additionally, or alternatively, and as another example, the application may output a notification (e.g., a message, a sound output, a vibration, etc.), and/or may open an application on user device 210 when the user interface has been configured, when a third party is associated with a threshold score, and/or the like.

In this way, message configuration platform 230 may provide a set of instructions to configure the user interface of the application to display the set of messages.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram of an example implementation 600 relating to example process 500 shown in FIG. 5. FIG. 6 shows an example of message configuration platform 230 determining a manner in which to configure a user interface based on transaction information related to a transaction completed via user device 210. As shown in FIG. 6, implementation 600 includes user device 210 and message configuration platform 230.

As shown in FIG. 6, and by reference number 610, a user of user device 210 may have navigated a web browser to a web page for a third party (e.g., third party A). For example, the web page may be associated with completing a transaction with third party A. In some implementations, a user of user device 210 may be completing the transaction via an application, associated with third party A, installed on user device 210.

As shown by reference number 620, message configuration platform 230 may receive transaction information related to the transaction being completed via user device 210. In some implementations, message configuration platform 230 may receive the transaction information from server device 220 associated with third party A (e.g., server device 220 associated with an electronic commerce system). Additionally, or alternatively, message configuration platform 230 may receive the transaction information from transaction backend device 240 and/or user device 210. In some implementations, message configuration platform 230 may receive the transaction information in real-time or near real-time as the transaction is being completed, after the transaction has been completed, and/or the like.

As shown by reference number 630, message configuration platform 230 may determine a manner in which to configure a user interface of an application to display messages based on the transaction information. For example, message configuration platform 230 may determine the manner in which to configure the user interface in a manner similar to that described elsewhere herein. For example, and as shown by reference number 640, message configuration platform 230 may determine that the user interface is to display messages associated with third party A, shown as messages M1 and M4. In addition, message configuration platform 230 may determine that message M1 is to be displayed with a higher priority on the user interface relative to message M4 (e.g., based on a higher ranking of message M1 relative to message M4). As shown by reference number 650, message configuration platform 230 may provide a set of instructions to user device 210 to configure the user interface in the determined manner.

In some implementations, a user of user device 210 can toggle this functionality on and off. For example, the user of user device 210 may want particular transactions to be kept private, and as such, toggling this functionality off may prevent message configuration platform 230 from processing a transaction.

As indicated above, FIG. 6 is provided merely as an example. Other examples are possible and may differ from what was described with regard to FIG. 6. Although FIG. 6 was described with regard to message configuration platform 230, the implementations apply equally to user device 210 (e.g., an application installed on user device 210).

In this way, message configuration platform 230 dynamically prioritizes messages in an electronic messaging account based on transaction information related to an individual associated with user device 210 so that the messages are quickly and easily accessible by a user of user device 210. This reduces or eliminates a need for the user to perform a search for the messages, thereby conserving processing resources of devices associated with hosting and/or accessing the electronic messaging account. In addition, this increases an accessibility of messages based on a location of user device 210, thereby improving the manner in which the user is provided with access to messages. Further, this conserves processing resources that would otherwise be consumed via manual use of a user interface to perform a search for messages associated with a transaction.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, configured to:
receive transaction information that identifies:
a transaction,
an individual associated with the transaction, and
a third party associated with the transaction;
identify, in an electronic messaging account associated with the individual, a set of messages,
the set of messages including a first message associated with the transaction;
determine a score for the first message based on one or more factors;
determine, based on the transaction information and the score for the first message, a manner in which to configure a user interface of an application associated with a user device to display the set of messages based on the transaction information,
the user device being associated with the individual; and
provide a set of instructions to the user device to configure the user interface of the application to display the set of messages.

2. The device of claim 1, where the one or more processors are further configured to:
process the set of messages using a set of processing techniques after receiving the transaction information,
the set of processing techniques including at least one of:
a text processing technique,
an image processing technique,
an audio processing technique, or
a machine learning technique.

3. The device of claim 1, where the one or more processors, when determining the manner in which to configure the user interface, are configured to:
determine the manner in which to configure the user interface based a timestamp associated with the transaction.

4. The device of claim 1, where the one or more processors are further configured to:
receive access information related to the electronic messaging account,
the access information being associated with providing the device with access to the electronic messaging account; and
where the one or more processors, when identifying the set of messages, are configured to:
identify the set of messages after receiving the access information.

5. The device of claim 1, where the one or more processors are further configured to:
receive updated transaction information after providing the set of instructions to the user device; and
determine another manner in which to configure the user interface after receiving the updated transaction information.

6. The device of claim 5, where the one or more processors are further configured to:
provide another set of instructions to the user device to configure the user interface in the other manner after determining the other manner in which to configure the user interface.

7. The device of claim 1, where the one or more processors, when determining the manner in which to configure the user interface, are configured to:
determine the manner in which to configure a set of user interface elements of the user interface.

8. A non-transitory computer-readable medium storing instructions, the instructions comprising:
one or more instructions that, when executed by one or more processors, cause the one or more processors to:

receive transaction information that identifies:
  a transaction,
  an individual associated with the transaction, and
  a third party associated with the transaction;
identify, in an electronic messaging account associated with the individual, a set of messages,
  the set of messages including a first message associated with the transaction;
determine a score for the first message based on one or more factors;
determine, based on the transaction information and the score for the first message, a manner in which to configure a user interface of an application associated with a user device to display the set of messages based on the transaction information,
  the user device being associated with the individual; and
provide a set of instructions to the user device to configure the user interface of the application to display the set of messages.

9. The non-transitory computer-readable medium of claim 8, where the set of messages includes a second message not associated with the transaction; and
where the one or more instructions, that cause the one or more processors to determine the manner in which to configure the user interface, cause the one or more processors to:
  determine to configure the user interface by prioritizing the first message higher relative to the second message.

10. The non-transitory computer-readable medium of claim 8, where the one or more instructions, when executed by the one or more processors, further cause the one or more processors to:
  map the set of messages to a set of third party identifiers that identifies a set of third parties associated with the set of messages; and
  where the one or more instructions, that cause the one or more processors to identify the set of messages, cause the one or more processors to:
    identify the set of messages after mapping the set of messages to the set of third party identifiers.

11. The non-transitory computer-readable medium of claim 8, where the one or more instructions, when executed by the one or more processors, further cause the one or more processors to:
  detect, based on information received from the user device, that the application was opened on the user device; and
  where the one or more instructions, that cause the one or more processors to provide the set of instructions, cause the one or more processors to:
    provide the set of instructions to the user device after detecting that the application was opened.

12. The non-transitory computer-readable medium of claim 8, where the one or more instructions, that cause the one or more processors to determine the manner in which to configure the user interface, cause the one or more processors to:
  determine the manner in which to configure a set of user interface elements of the user interface.

13. The non-transitory computer-readable medium of claim 8, where the one or more instructions, when executed by the one or more processors, further cause the one or more processors to:
  monitor the transaction information to determine whether the transaction information has been updated; and
  determine another manner in which to configure the user interface after determining that the transaction information has been updated.

14. The non-transitory computer-readable medium of claim 13, where the one or more instructions, when executed by the one or more processors, further cause the one or more processors to:
  provide another set of instructions to the user device to configure the user interface in the other manner after determining the other manner in which to configure the user interface.

15. A method, comprising:
receiving, by a device, transaction information that identifies:
  a transaction,
  an individual associated with the transaction, and
  a third party associated with the transaction;
identifying, by the device, in an electronic messaging account associated with the individual, a set of messages,
  the set of messages including a first message associated with the transaction;
determining, by the device, a score for the first message based on one or more factors;
determining, by the device and based on the score for the first message, a manner in which to configure a user interface of an application associated with a user device to display the set of messages based on the transaction information,
  the user device being associated with the individual; and
providing, by the device, a set of instructions to the user device to configure the user interface of the application to display the set of messages,
  the set of instructions causing the user interface to display the first message with information relating to the transaction.

16. The method of claim 15, where the one or more factors includes at least one of:
  a timestamp associated with the transaction, or
  a value associated with the transaction.

17. The method of claim 15, further comprising:
  determining a ranking for the first message, relative to other messages included in the set of messages, based on the score; and
  where determining the manner in which to configure the user interface comprises:
    determining the manner in which to configure the user interface based on the ranking.

18. The method of claim 15, where identifying the set of messages includes:
  accessing the electronic messaging account using at least one of:
    a username/password combination, or
    a security token.

19. The method of claim 15, further comprising:
  providing a notification for display, via the user device, indicating that the user interface has been configured in the manner.

20. The method of claim 15, further comprising:
  monitoring the transaction information to determine whether the transaction information has been updated; and
  determining another manner in which to configure the user interface after determining that the transaction information has been updated.

* * * * *